US008712609B2

(12) United States Patent
Kadavil et al.

(10) Patent No.: US 8,712,609 B2
(45) Date of Patent: Apr. 29, 2014

(54) METHODS AND SYSTEMS FOR REPRESENTING MISSED APPROACH INFORMATION IN PERSPECTIVE VIEW ON A COCKPIT DISPLAY

(75) Inventors: Navin Kadavil, Karnataka (IN); Anil Kumar Songa, Karnataka (IN); Prashant Prabhu, Karnataka (IN); Ravindra Jayaprakash, Karnataka (IN); Sadguni Venkataswamy, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 112 days.

(21) Appl. No.: 13/470,848

(22) Filed: May 14, 2012

(65) Prior Publication Data

US 2013/0304284 A1    Nov. 14, 2013

(51) Int. Cl.
G06F 19/00 (2011.01)
G06G 7/70 (2006.01)
G08G 5/00 (2006.01)

(52) U.S. Cl.
USPC ................ 701/16; 701/17; 340/947; 340/951

(58) Field of Classification Search
USPC ................... 701/16, 5; 73/178; 340/947, 951
See application file for complete search history.

(56) References Cited

U.S. PATENT DOCUMENTS

| | | | |
|---|---|---|---|
| 5,420,582 A * | 5/1995 | Kubbat et al. | 340/974 |
| 6,922,703 B1 * | 7/2005 | Snyder et al. | 345/633 |
| 7,302,318 B2 | 11/2007 | Gerrity et al. | |
| 7,640,082 B2 * | 12/2009 | Dwyer | 701/3 |
| 7,693,621 B1 | 4/2010 | Chamas | |
| 7,715,954 B2 * | 5/2010 | Ingram et al. | 701/11 |
| 7,715,955 B2 | 5/2010 | Tatham et al. | |
| 7,920,943 B2 | 4/2011 | Campbell et al. | |
| 7,986,249 B2 | 7/2011 | Wilson et al. | |
| 8,073,578 B1 | 12/2011 | McCusker | |
| 8,255,099 B2 * | 8/2012 | Ingram et al. | 701/11 |
| 8,319,667 B2 * | 11/2012 | Burgin et al. | 340/971 |
| 2003/0083804 A1 * | 5/2003 | Pilley et al. | 701/120 |
| 2004/0225432 A1 * | 11/2004 | Pilley et al. | 701/117 |
| 2010/0168939 A1 | 7/2010 | Doeppner et al. | |
| 2010/0305786 A1 * | 12/2010 | Boorman | 701/16 |

OTHER PUBLICATIONS

Barrows, A. K. et al.; Flight Tests of a 3-D Perspective-View Glass-Cockpit Display for General Aviation Using GPS, Department of Aeronautics and Astronautics, Stanford University; Presented at ION GPS-95, Palm Springs, CA, USA, Sep. 12-15, 1995.

Pruyn, P.W. et al.; Exploring 3D Computer Graphics in Cockpit Avionics; Three-dimensional symbolic representations visualize and integrate flight information for tasks such as navigation, collision avoidance, and the instrument approach, IEEE Computer Graphics & Applications, 1993.

EP Search Report for Application No. 13 164 019.5 dated Jul. 24, 2013.

EP Communicatin, EP 13 164 019.5-1904 dated Dec. 8, 2013.

* cited by examiner

*Primary Examiner* — Thomas Black
*Assistant Examiner* — Tyler Paige
(74) *Attorney, Agent, or Firm* — Ingrassia Fisher & Lorenz, P.C.

(57) ABSTRACT

A method is provided for displaying information on a display device of an aircraft. The method comprises determining graphics data for visual aids that represent missed approach data; incorporating the graphics data into a user interface that is in perspective view; and generating the user interface for display on the display device of the aircraft.

18 Claims, 4 Drawing Sheets

METHODS AND SYSTEMS FOR REPRESENTING MISSED APPROACH INFORMATION IN PERSPECTIVE VIEW ON A COCKPIT DISPLAY

TECHNICAL FIELD

The present disclosure generally relates to methods and systems for presenting flight information on a display, and more particularly relates to methods and systems of presenting missed approach information on a display of an aircraft.

BACKGROUND

A missed approach occurs when one or more conditions occur that cause a pilot to abort a landing procedure. A missed approach procedure requires the pilot to maintain an altitude above a particular height and return to the landing structure. The altitude ensures that the aircraft remains clear of obstacles.

For example, upon reaching a decision height (DH) (height above ground level (AGL)) or a minimum descent altitude MDA, a missed approach procedure may be initiated when a visual reference to continue the approach to land has not been established. The procedure may require that the pilot contact the air traffic control tower, retract flaps, and initiate full power for a positive rate of climb. Knowing what location at which the aircraft will reach the DH (also referred to as the missed approach point (MAP)) or the MDA in advance to reaching the location will aid the pilot in making the decision of whether to initiate the missed approach procedure. Conventional methods provide the DH/MDA through a readout indicating the altitude of the DH/MDA and provide an alert when the aircraft has reached the DH/MDA. These methods do not provide visualization of the time left or how close the aircraft is to the DH/MDA. These methods do not aid in the anticipation or natural transition to executing the missed approach procedure.

Hence, there is a need for systems and methods for presenting a visual of this information in advance to the pilot in the aircraft. Other desirable features and characteristics will become apparent from the subsequent detailed description and the appended claims, taken in conjunction with the accompanying drawings and the foregoing technical field and background.

BRIEF SUMMARY

In one embodiment, a method is provided for displaying information on a display device of an aircraft. The method comprises determining graphics data for visual aids that represent missed approach data; incorporating the graphics data into a user interface that is in perspective view; and generating the user interface for display on the display device of the aircraft.

In another embodiment, a system is provided for displaying information on a display device of an aircraft. The system comprises an information datastore; and a computer module. The computer module accesses the data storage device to determine graphics data for visual aids that represent missed approach data, incorporates the graphics data into a user interface that is in perspective view, and generates the user interface for display on the display device of the aircraft.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
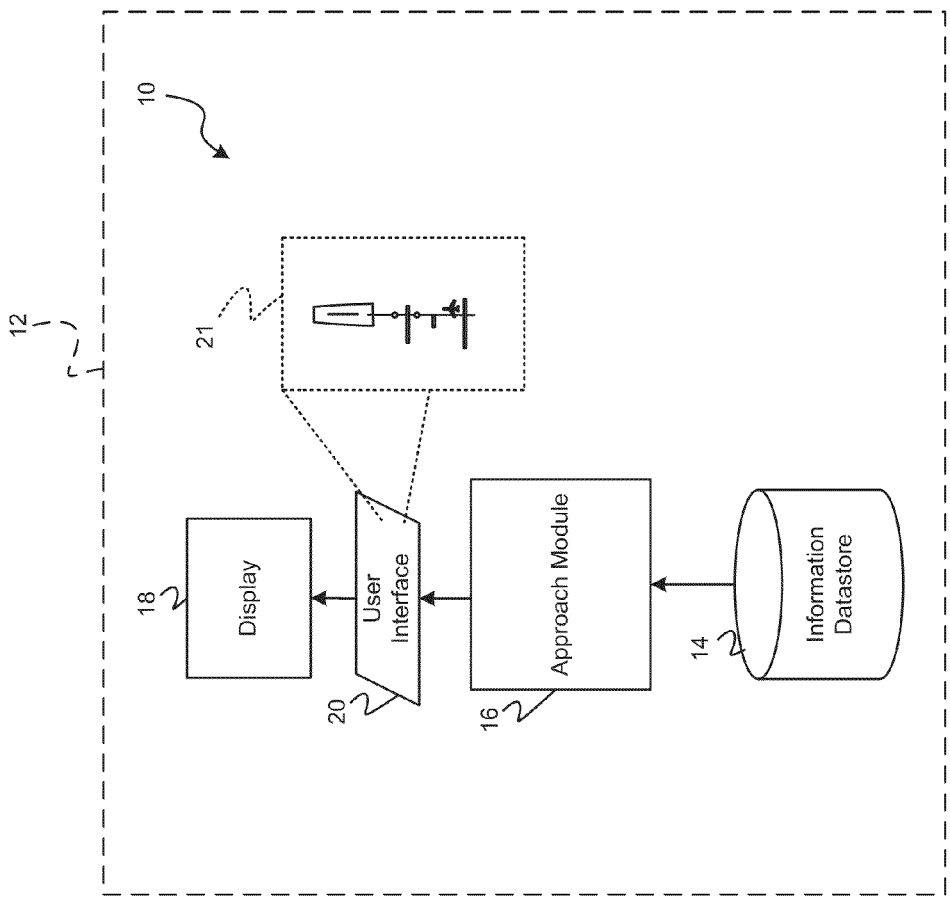
FIG. 1 is a functional block diagram illustrating an approach system for an aircraft in accordance with exemplary embodiments.

Referring now to FIG. 1, exemplary embodiments of the present disclosure are directed to an electronic approach system shown generally at 10 that is associated with an aircraft 12. As can be appreciated, the electronic approach system 10 described herein can be implemented in any aircraft 12 having onboard a computing device that is associated with a display device, where the computing device includes at least a processor, and one or more data storage devices.

As shown in FIG. 1, the electronic approach system 10 includes, but is not limited to, an information datastore 14, an approach module 16, and a display 18. The information datastore 14 stores landing information at various airports. Such information can include, but is not limited to, altitudes for safe landing, glide path information, touchdown point information, decision height information, minimum decent altitude information, etc. As can be appreciated, the information datastore 14 may reside in a data storage device of the computing device on the aircraft 12, may reside in a data storage device on a computing device at a location remote from the aircraft 12 (e.g., on a central server), or may partially reside on the computing device of the aircraft 12 and partially on the computing device at the location remote from the aircraft 12.

The approach module 16 may include one or more instructions that may be executed by the processor of the computing device. The instructions of the approach module 16 access the information datastore 14, determine approach information 21, and generate a user interface 20 having the approach information 21. As can be appreciated, depending on the location of the information datastore 14, the approach module 16 may communicate with the information datastore 14 directly, and/or may communicate with the information datastore 14 indirectly through one or more communication protocols.

The display 18 displays the user interface 20. The display 18 may be located in a cockpit of the aircraft 12 for viewing by, for example, a pilot of the aircraft 12. In various embodiments, the user interface 20 may automatically display the approach information 21 based on a flight condition of the aircraft 12. In various other embodiments, a pilot may interact with the user interface 20 to display the approach information 21 using one or more input devices of the computing system. In general, the approach information 21 is displayed from the inception of the approach. Thus, the approach information 21 enables the pilot to visualize the approach and better anticipate a missed approach. For example, the approach information 21 enables the pilot to visualize if he/she has to climb straight ahead or climb to the left or right in case of a missed approach.

Figure 2:
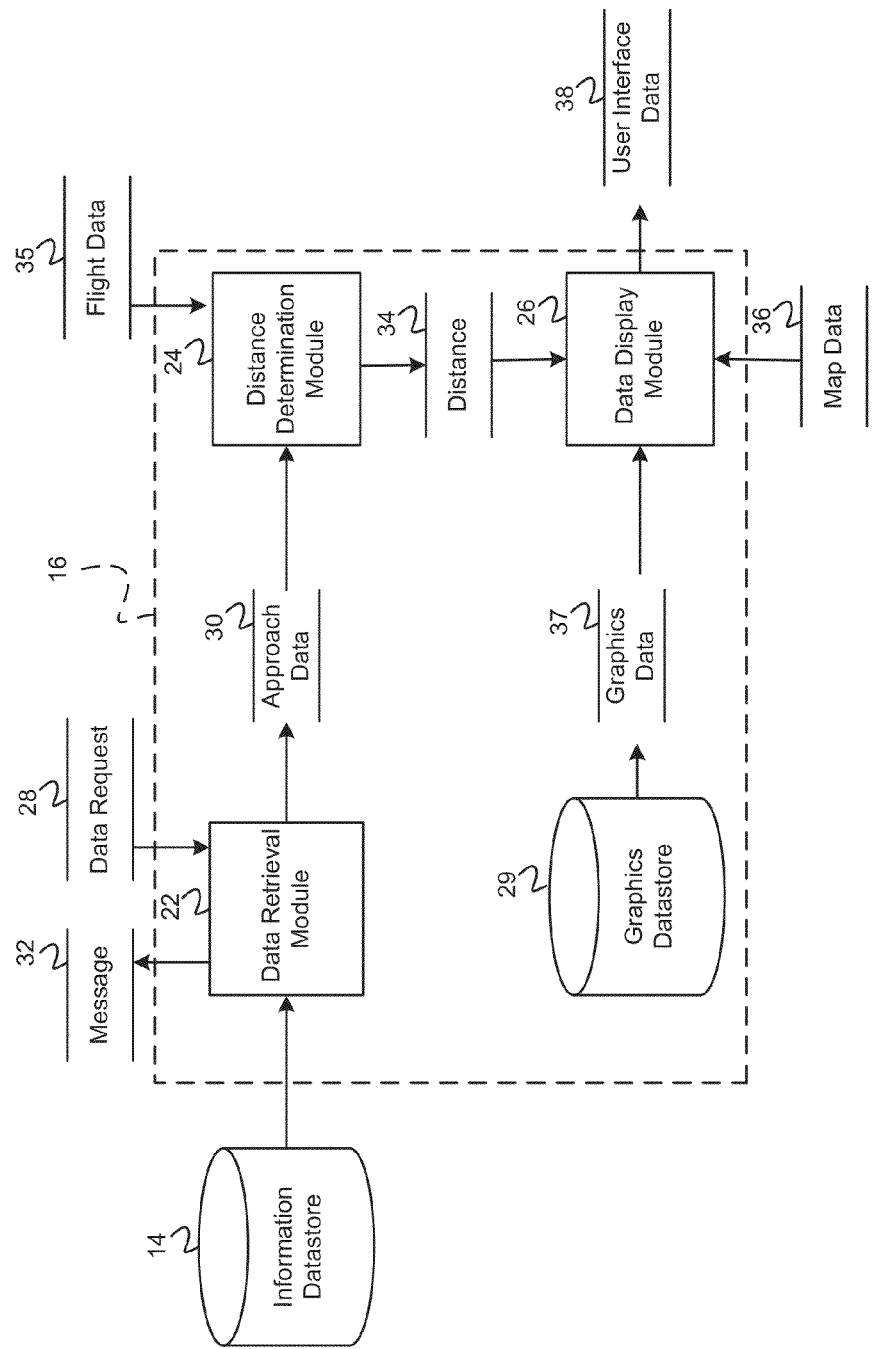
FIG. 2 is dataflow diagram illustrating an approach module that communicates with an information datastore of the approach system in accordance with exemplary embodiments.

Referring now to FIG. 2, a dataflow diagram illustrates various embodiments of the approach module 16 of the electronic approach system 10. Various embodiments of electronic approach systems 10 according to the present disclosure may include any number of sub-modules embedded within the approach module 16. As can be appreciated, the sub-modules shown in FIG. 2 may be combined and/or further partitioned to similarly determine and display approach information 21. Inputs to the approach module 16 may be received from other modules (not shown), determined/modeled by other sub-modules (not shown) within the approach module 16, and/or may be user input that is based on a user interacting with the user interface 20. In various embodiments, the approach module 16 includes a data retrieval module 22, a distance determination module 24, a data display module 26, and a graphics datastore 29.

The data retrieval module 22 receives as input a data request 28. The data request 28 includes data indicating that the approach information 21 is desired for a particular runway of a particular airport (e.g., an indication that the aircraft 12 is approaching a particular runway at a particular airport or a user simply requesting the information for a particular runway of an airport). Based on the data request 28, the data retrieval module 22 retrieves from the information datastore 14 approach data 30 associated with landing the aircraft at the runway of the airport. For example, the approach data 30 can include, but is not limited to, a glide path angle, a touchdown point, a decision height, and/or a minimum descent altitude. If the approach data 30 is not available in the information datastore 14, the data retrieval module 22 may generate a message 32 indicating that the approach data 30 is not available.

The distance determination module 24 receives as input the approach data 30. The distance determination module 24 uses the approach data 30 to determine a distance 34 from the touchdown point where the decision height or the minimum descent altitude would be achieved. The distance determination module 24 determines the distance 34 based on a prescribed flight path, or alternatively, computes the distance 34 based on real-time flight data.

In various embodiments, the distance determination module 24 computes the distance 34 from the touchdown point based on either the decision height (DH) or the minimum decent altitude (MDA). For example, if the system provides for a precision approach, the approach data determination module computes the distance using the DH; and if the system provides for a non-precision approach, the approach data determination module computes the distance using the MDA.

In various embodiments, the distance determination module 24 computes the distance 34 using one of the following equations:

$$D_{DH} = DH/\tan GPA \tag{1}$$

or $$D_{MSA} = MDA/\tan GPA \tag{2}$$

Where $D_{DH}$ represents the distance from a touchdown point for the precision approach. $D_{MSA}$ represents the distance from a touchdown point for the non-precision approach. MDA represents the minimum decent altitude. GPA represents the glide path angle. As can be appreciated, the GPA can be the current glide path angle from the real-time flight data of the aircraft, or a prescribed glide path angle retrieved from the information datastore 14.

In various embodiments, the distance termination module 24 can alternatively or additionally determine a time from the touchdown point for both the precision approach and the non-precision approach. The time may be used in place of or in addition to the distance for displaying the approach information 21.

The data display module 26 receives as input the distance 34, and map data 36. The map data 36 can include data for displaying an airport map or other information associated with the runway (e.g., approach symbols). In various embodiments, the map data 36 provides a perspective view of the airport information. For example, the map data 36 can include terrain information of the airport in a perspective view. The airport map can include, for example, but is not limited to, a moving map, an airport moving map, or a Synthetic Vision System (SVS).

Figure 3D:
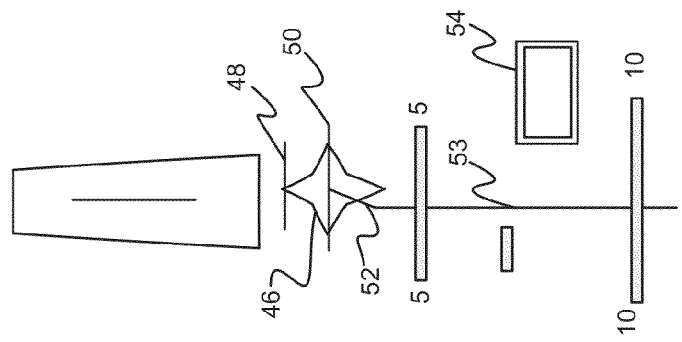
FIGS. 3A through 3D are illustrations of graphical aids of a user interface that may be generated by the approach module and displayed on a display device of the aircraft in accordance with exemplary embodiments.

Based on the distance 34 and the map data 36, the data display module determines what aid to display and how to display the aid (e.g., at what location and what orientation). For example, the data display module 26 retrieves graphics data 37 from the graphics datastore 29. The graphics data 37 includes data that defines graphical representations of visual aids that may be incorporated into the user interface 20 to illustrate the approach information 21. For example, as shown in FIGS. 3A and 3B, the visual aid can include one or more marker points 40, 42 that may be color filled circles (e.g., white or any other color) with a black halo. In various embodiments, the marker point 40 represents the location of the decision height. In various other embodiments, the marker point 42 represents the minimum descent altitude and the marker point 41 represents the missed approach point or decision height.

Figure 3C:
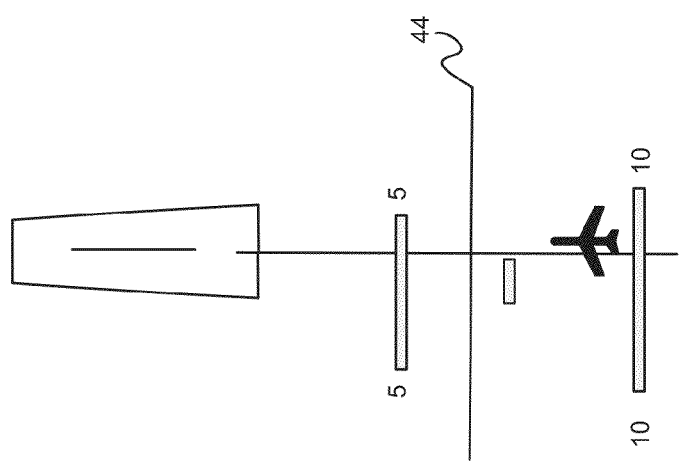
Figure 3B:
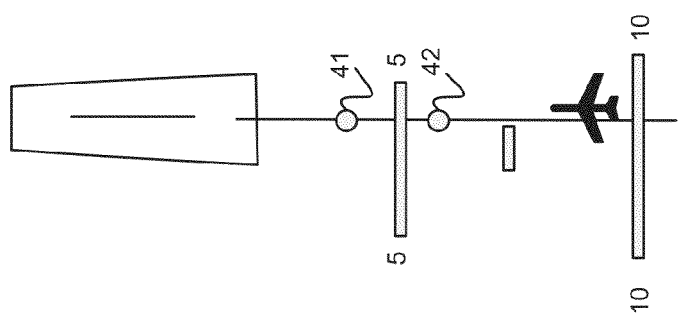
Figure 3A:
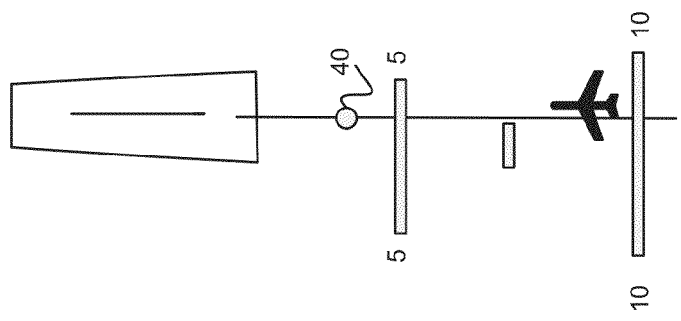

In another example, as shown in FIG. 3C, the visual aid can include a dynamically moving range ring 44 that includes a horizontal line as disclosed in U.S. Pat. No. 7,917,289, which is incorporated herein by reference in its entirety.

In yet another example, as shown in FIG. 3D, the visual aid can include a three-dimensional waypoint 46 as disclosed in U.S. Patent Publication No. 2010/0131126, which is incorporated herein by reference in its entirety. The waypoint 46 can include a time constraint, or a color feature for indicating that it is associated with the missed approach information 21. In various embodiments, the waypoint 46 can include an "at" constraint 48 and an "above" constraint 50. In various embodiments, the waypoint 46 can include tether lines 52 on or near the approach course line in a perspective view on the flight plan. In addition or alternatively, a list box 54 can display the distance from the decision height to a runway threshold (e.g., the touchdown point).

With reference back to FIG. 2, the data display module 26 generates user interface data 38 to display the graphics data 37 in relation to the map data 36. For example, the data display module 26 incorporates the graphics data 37 into the map data 36 by overlaying the graphics data 37 on the map data 36 at a location that represents the distance data relative to the map, thus displaying the approach information 21 on the map itself. For example, the graphics data 37 may be overlaid on the map data 36 in a relation to approach symbols (e.g., an approach course line 53 FIG. 3D). In another example, the data display module 26 incorporates the graphics data 37 by adding the graphics data 37 to the map data 36 to display the approach information 21 at a location adjacent to the airport map (e.g., in another area of the display 18).

Figure 4:
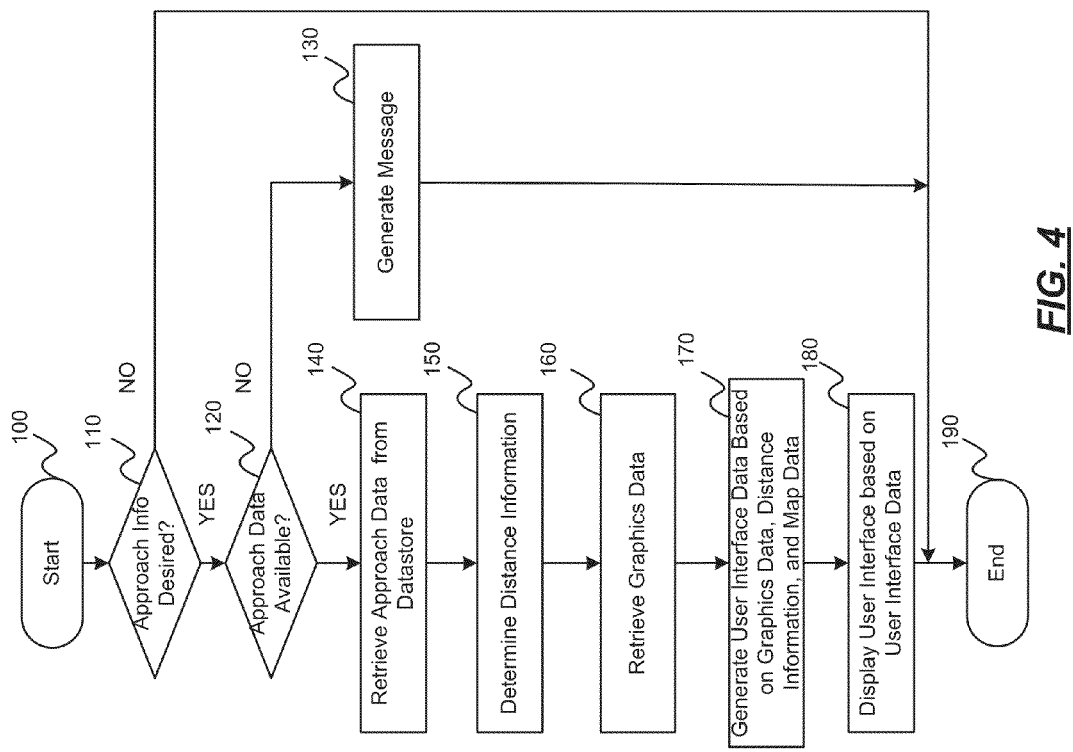
FIG. 4 is a flowchart illustrating an information display method that may be performed by the approach module in accordance with exemplary embodiments.

Referring now to FIG. 4, and with continued reference to FIGS. 1 and 2, a flowchart illustrates a display method that can be performed by the approach module 16 of FIG. 2 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure.

In various embodiments, the method can be scheduled to run based on predetermined events, and/or can run continually during operation of the computing device of the aircraft 12.

The method may begin at 100. It is determined whether the data request 28 is received indicating that approach information 21 is desired at 110. If approach information 21 is not desired at 110, the method may end at 190.

If, however, the approach information 21 is desired (e.g., when approaching a runway) at 110, yet the approach data 30 is not available at 120, a message 32 may be generated indicating such at 130, and the method may end at 190.

If, however, the approach information 21 is desired (e.g., when approaching a runway) at 110, and the approach data 30 is available at 120, the approach data 30 associated with the airport is retrieved from the information datastore 14 at 140. The flight data 35 and the approach data 30 are used to compute the distance 34 at 150. The graphics data 37 is retrieved from the graphics datastore 29 at 160. The user interface data 38 is generated based on the graphics data 37, the distance 34, and the map data 36 at 170. The user interface 20 is displayed based on the user interface data 38 at 180. Thereafter, the method may end at 190.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of displaying information on a display device of an aircraft, comprising:
   determining from graphics data, data for visual aids that represent missed approach data;
   incorporating the data for the visual aids into a user interface that includes a perspective view of a flight plan, wherein the data is incorporated at a location in the flight plan that is relative to a current location of the aircraft; and
   generating the user interface for display on the display device of the aircraft.

2. The method of claim 1 further comprising determining a missed approach distance or time; and wherein the incorporating the data into the user interface is based on the missed approach distance.

3. The method of claim 2 wherein the determining the missed approach distance or time is based on at least one of a decision height and a minimum descent altitude.

4. The method of claim 2 wherein the determining the missed approach distance or time is based on real-time flight data.

5. The method of claim 4 wherein the real-time flight data includes a current glide path angle.

6. The method of claim 2 wherein the determining the missed approach distance or time is based on prescribed flight data.

7. The method of claim 6 wherein the prescribed flight data includes a prescribed glide path angle.

8. The method of claim 1 wherein the determining the graphics data comprises determining at least one marker point.

9. The method of claim 1 wherein the determining the graphics data comprises determining a range ring.

10. The method of claim 1 wherein the determining graphics data comprises determining data for a waypoint.

11. A system for displaying information on a display device of an aircraft, comprising:
    an information datastore; and
    a computer module that accesses the data storage device to determine from graphics data, data for visual aids that represent missed approach information of a missed approach procedure, that incorporates the data for the visual aids into a user interface that includes a perspective view of a flight plan, wherein the data is incorporated at a location in the flight plan that is relative to a current location of the aircraft, and that generates the user interface for display on the display device of the aircraft.

12. The system of claim 11 wherein the computer module determines a missed approach distance or time; and incorporates the data into the user interface based on the missed approach distance or time.

13. The system of claim 12 wherein the computer module determines the missed approach distance or time based on at least one of a decision height and a minimum descent altitude.

14. The system of claim 12 wherein the computer module determines the missed approach distance or time based on real-time flight data.

15. The system of claim 14 wherein the real-time flight data includes a current glide path angle.

16. The system of claim 12 wherein the computer module determines the missed approach distance or time based on prescribed flight data.

17. The system of claim 16 wherein the prescribed flight data includes a prescribed glide path angle.

18. The system of claim 11 wherein the computer module determines the data for the visual aids based on at least one of a marker point, a range ring, and a waypoint.

* * * * *